Figure 1:
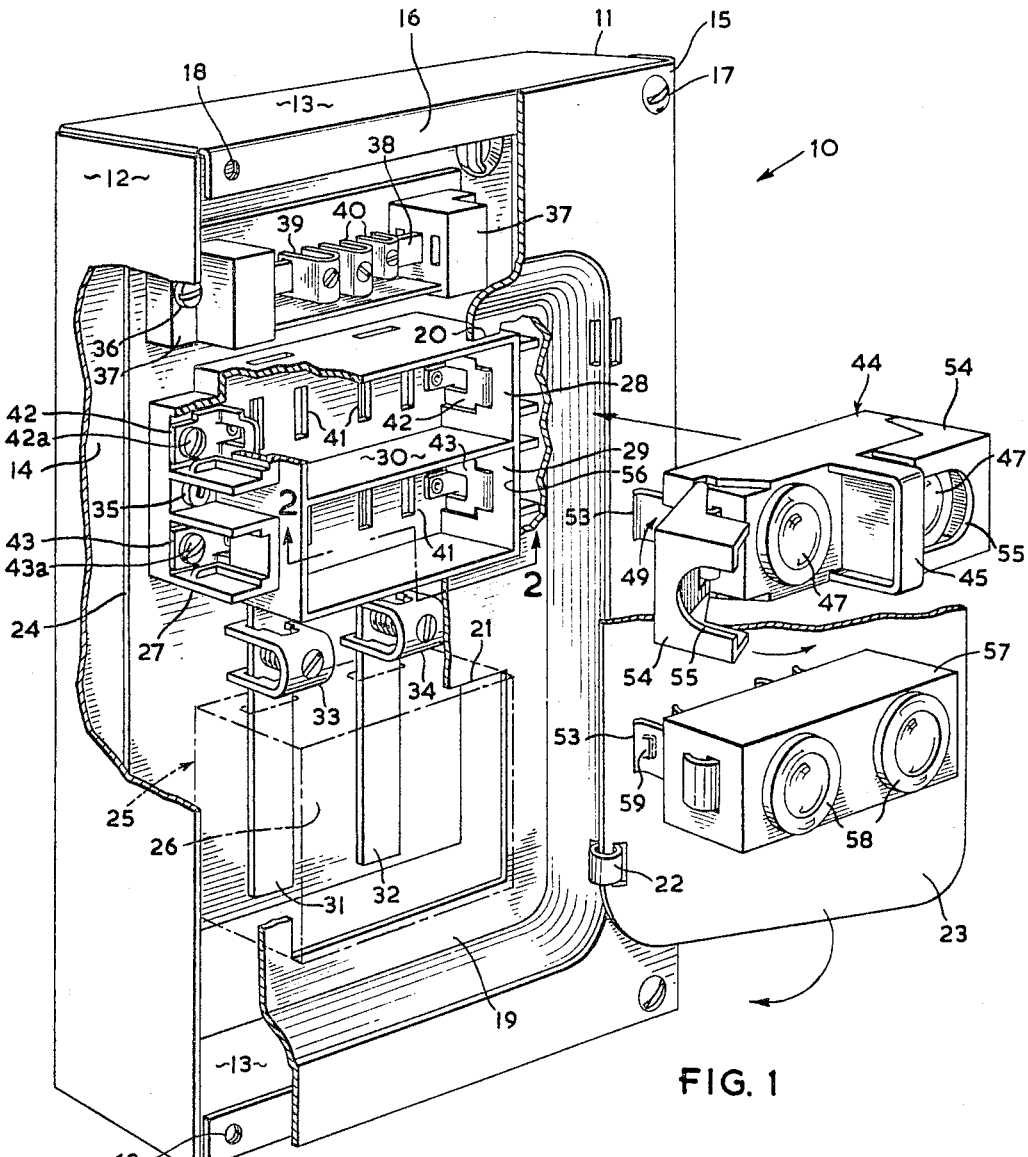

Sept. 13, 1966  C. E. McROBERTS  3,273,022
ELECTRICAL LOAD DISTRIBUTION SERVICE CENTRE
Filed Aug. 5, 1963

CHARLES E. McROBERTS
INVENTOR

BY
PATENT AGENT

United States Patent Office 3,273,022
Patented Sept. 13, 1966

3,273,022
ELECTRICAL LOAD DISTRIBUTION SERVICE CENTRE
Charles E. McRoberts, Toronto, Ontario, Canada, assignor to Amalgamated Electric Corporation, Limited, Toronto, Ontario, Canada
Filed Aug. 5, 1963, Ser. No. 299,749
9 Claims. (Cl. 317—116)

Electrical energy normally is supplied to residential occupancies by a three wire feeder circuit with a grounded neutral conductor so that there is a potential of approximately 120 volts between each of the ungrounded conductors and the grounded neutral conductor and a potential of approximately 240 volts between the two ungrounded conductors. The three wire supply terminates in an electrical load distribution service centre where the neutral conductor is connected to a neutral busbar and the two ungrounded conductors are connected to separate busbars.

Electrical energy is distributed through the residence from the electrical load distribution service centre by three wire and two wire branch circuits which are protected against overload by overcurrent devices such as fuses interposed between the live busbars and the ungrounded conductors of the branch circuits.

Overcurrent devices generally are not permitted in the grounded neutral conductors. Thus, a three wire branch circuit consists of two conductors connected one to each of the live busbars through overcurrent devices, and one conductor connected directly to the neutral busbar. It follows, therefore, that in a three wire branch circuit there will be a potential of approximately 120 volts between each of the ungrounded conductors and the grounded neutral conductor and a potential of approximately 240 volts between the two ungrounded conductors.

A two wire branch circuit consists of one conductor connected to either of the live busbars through an overcurrent device, and one conductor connected directly to the neutral busbar, and it follows, therefore, that there will be a potential of approximately 120 volts between the ungrounded and grounded conductors of a two wire branch circuit.

It is a general requirement that each branch circuit be provided with a manually operable device which will safely disconnect, simultaneously, all ungrounded conductors at their points of supply. Thus, disconnect devices must be incorporated into the electrical load distribution service centre with one disconnect device for each three wire branch circuit, which will manually disconnect simultaneously the two ungrounded conductors, and with one disconnect device for each two wire circuit, which will manually disconnect the ungrounded conductor.

Until recently the only three wire branch circuits used in residential wiring have been those supplying fixed heavy loads such as ranges and clothes dryers. Fusible overcurrent protection has been provided by cartridge fuses, and the simultaneous manual disconnection of the ungrounded conductor has been achieved by mounting the fuses in a block which is plugged into a receptacle in the service centre to complete the circuit to the load from the busbars through the fuses, and which is pulled out of the receptacle to interrupt the circuit. The branch circuits supplying fixed lighting and plug-in outlet receptacles for the connection of appliances and portable lighting equipment have been two wire circuits in which the overload protection has been provided by screw-in plug fuses. In a two wire branch circuit, the removal and insertion of the screw-in plug fuse is accepted as the disconnect means for the single ungrounded conductor of the circuit.

With the increasing loads due to the growing power requirements of modern appliances, particularly those used in kitchens and laundries, it has become, or is becoming mandatory to provide three wire branch circuits to the outlet receptacles in such locations. The outlet receptacles supplied by the three wire branch circuits will receive plugs from two, two wire 120 volt appliances and will deliver the full capacity of the circuit to each appliance, so that a three wire branch circuit will supply twice the load of a two wire branch circuit. In other words, with a 50% increase in copper, a 100% increase in capacity is obtained. Equipment of the type previously described using cartridge fuses is available for the protection and disconnection of these three wire branch circuits, but to the best of my knowledge, there has not previously been made available equipment suitable for use with screw-in plug fuses.

It is desirable that equipment for the protection and disconnection of three wire branch circuits using screw-in plug fuses should be made available. Screw-in plug fuses are universally available and are obtainable at low cost. Plug fuses are self indicating, showing at a glance if they have "blown" due to overload. Whether or not a cartridge fuse has "blown" can only be determined by testing it for continuity. Thus, in an electrical load distribution service centre with a number of cartridge fuses, it could take considerable time to locate a "blown" fuse in order to replace it. Furthermore, there are available for use with plug fuses, and not with cartridge fuses, standardized devices which can be permanently inserted in the fuse receptacle to prevent the installation of oversized fuses which create a fire hazard, because of possible overheating of the branch circuit conductors.

Accordingly, one object of this invention is to provide an electrical load distribution service centre which, at the time of installation and wiring thereof, can be wired with either or both two wire or three wire branch circuits with overload protection in the form of screw-in overcurrent devices.

Another object of this invention is to provide a service centre of the aforementioned type wherein, once a two wire branch circuit installation has been made, it cannot be readily changed to a three wire branch circuit, and wherein screw-in overcurrent devices in the two wire branch circuits can be readily removed to disconnect the two wire branch circuits.

Yet a further object of this invention is to provide a service centre of the aforementioned type wherein three wire branch circuits supplied from the service centre contain two overcurrent devices which must be removed simultaneously, and which are designed so that independent removal of the overcurrent devices when they are in circuit is not possible.

Yet another important object of this invention is to provide a service centre of the aforementioned type which permits the removal of both screw-in overcurrent devices in a three-wire branch circuit without requiring the removal of the cover panel of the service centre housing.

In brief, in accordance with one embodiment of this invention there is provided an electrical load distribution service centre which comprises a housing including a removable panel with at least one opening therein. Positioned in the housing behind the panel and electrically insulated from each other are a neutral busbar and two other busbars. There is provided at least one plug-in receptacle which is adapted to accommodate two screw-in overcurrent devices. The receptacle has two first contact means and two second contact means. Each of the first contact means is adapted to contact a different one of the two busbars, when the receptacle is positioned in the housing, and also is adapted to contact a terminal of a different one of the overcurrent devices, when the overcurrent devices are screwed into the receptacle.

Each of the second contact means is adapted to contact another terminal of a different one of the overcurrent devices, when the overcurrent devices are screwed into the receptacle. In this manner circuits for each of the two busbars, through the first contact means and through the overcurrent devices to the second contact means are established when the receptacle is positioned in the housing and the overcurrent devices are screwed into the receptacle. There are at least two contacts within the housing, each of which is adapted to contact a different one of the second contact means when the receptacle is positioned in the housing. In accordance with one feature of this ivention, the size of the opening in the panel is sufficiently large that the receptacle may be placed in the housing through the opening without removal of the panel, and inserted in the housing to an extent sufficient to effect contact between the busbars and the first contact means.

In accordance with another feature of this invention, in a three-wire branch circuit, means are provided for preventing independent removal of overcurrent devices screwed into the receptacle when the receptacle is positioned in the housing with the first contact means in contact with the two busbars.

Figure 2:
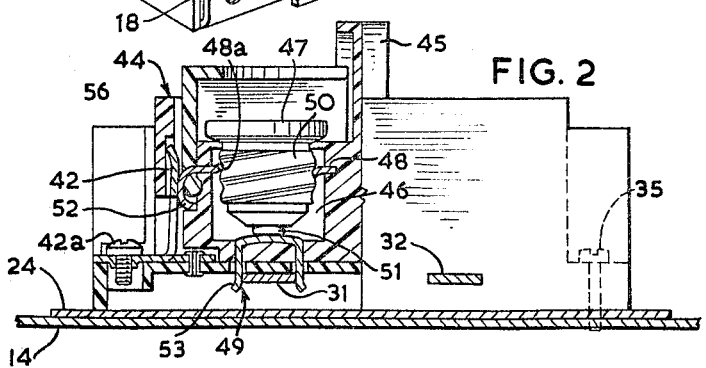

This invention will become more apparent from the following detailed description taken in conjunction with the appended drawings in which:

FIGURE 1 is a partially exploded perspective view of an electrical load distribution service centre embodying this invention, a part of the service centre being broken away to more clearly illustrate the same, and FIGURE 2 is a section taken along line 2—2 in FIGURE 1.

Referring to these figures, there is shown an electrical load distribution service centre 10 which includes a sheet metal housing 11 in the form of a rectangular box having side walls 12, end walls 13, a back wall 14, and a removable front panel 15. Front panel 15 is removably mounted on flanges 16, which form inturned extensions of end walls 13, by means of screws 17 at all four corners of panel 15. Screws 17 engage threaded apertures 18 in flanges 16.

Panel 15 has a depressed portion 19 in which are formed two openings 20 and 21 respectively. Hinged to panel 15 by hinges 22 is a door 23 which is adapted to close over depressed portion 19 and which, when in the closed position, is flush with the marginal portions of panel 15.

Positioned within housing 11 in abutment with back wall 14 is a panel 24 of electrical insulating material. Also positioned in housing 11 is a terminal box 25 made of electrical insulating material and having a removable top 26 which carries fuse holders (not shown) for cartridge fuses, which holders conductively engage contacts (not shown) in terminal box 25. Terminal box 25 is conventional in nature and, per se, forms no part of this invention. The contacts therein are arranged to permit the supply of a heavy duty three wire branch circuit for supplying electric energy to an electric stove. Terminal box 25 is secured within housing 11 by screws (not shown) which pass through insulating panel 24 and threadably engage apertures (not shown) in back wall 14.

Also positioned in housing 11 is another terminal box 27 which, in the embodiment shown, has two compartments 28 and 29 separated by a wall 30 of electrical insulating material. It will be appreciated, of course, that as many compartments as are required may be employed in terminal box 27, and that terminal box 27 is moulded from a suitable electrical insulating material. Terminal box 27 is fixed in position by screws 35 which threadably engage threaded apertures (not shown) in back wall 14.

Passing through both terminal boxes 25 and 27 are two busbars 31 and 32 which are adapted to be connected to the two live conductors of a three wire feeder supply by means of conventional clamp terminals 33 and 34, the two live conductors being brought into housing 11 through knockouts (not shown) in side walls 12 of housing 11. Busbars 31 and 32 are connected to the contacts housed in terminal box 25.

Positioned in housing 11 and fixed therein by screws 36 engaging threaded apertures (not shown) in back wall 14 are two supports 37 of electrical insulating material between which is mounted a busbar 38 which is adapted to be connected to the neutral conductor of a three wire feeder supply by a clamp terminal 39, the neutral conductor being brought into housing 11 through a knockout (not shown) in upper end wall 13. Other clamp terminals 40 are mounted on busbar 38 to permit the connection thereto of the return conductor of two or three wire branch circuits.

Referring again to terminal box 27, it will be seen that two sets of openings 41 are provided in the bottom wall of each of compartments 28 and 29, these openings permitting the insertion of prong contacts which engage busbars 31 (see FIGURE 2) and 32. Compartments 28 and 29 each have two contacts 42 and 43, respectively, associated therewith, these contacts being provided with screws 42a and 43a, respectively, to permit the connection of conductors for branch circuits to contacts 42 and 43.

As shown in FIGURES 1 and 2, a plug-in receptacle 44 moulded of electrical insulating material is provided and has a handle 45. Receptable 44 has two openings 46 therein each adapted to receive screw-in overcurrent devices such as plug fuses 47. Associated with each opening 46 are contacts 48 and 49. Contact 48 engages one terminal 50 of plug fuse 47, when plug fuse 47 is screwed into receptacle 44, while contact 49 engages the other terminal 51 of plug fuse 47, when plug fuse 47 is screwed into receptacle 44. Contacts 48 have portions 52 thereof which extend outwardly of receptacle 44 and engage contacts 42 when receptacle 44 is plugged into terminal box 27. Contacts 49, on the other hand, have prongs 53 associated therewith which engage busbars 31 and 32 when receptacle 44 is inserted in compartment 28 of terminal box 27. The parts 48a of contacts 48 are ring-shaped, and each forms a screw thread to permit threaded engagement with a plug fuse 47. Thus, it will be seen that when receptacle 44 is positioned in compartment 28 of terminal box 27, circuits are established from each of busbars 31 and 32 through contact 49, terminal 51, fuse 47, terminal 50, contact 48 and contact 42.

As is shown in FIGURES 1 and 2, flaps 54 are hingeably mounted on receptacle 44, portions 52 of contacts 48 forming the hinges. Flaps 54 have openings 55 therein which permit the viewing of the plug fuse 47 covered thereby when flaps 54 are closed over the plug fuse, so as to enable one to determine whether a fuse has "blown." However, it will be seen from FIGURE 2 that when receptacle 44 is plugged into terminal box 27, it is not possible to remove either of plug fuses 47 carried thereby, since removal of these fuses only can be effected by opening flaps 54, and the opening of flaps 54 is precluded by the abutment thereof against side walls 56 of terminal box 27.

When it is desired to have a three wire branch circuit with plug fuse protection, receptacle 44 is employed in compartment 28. Two of the conductors for the three wire branch circuit are connected to terminals 42 by screws 42a, while the other conductor is connected to busbar 38 by one clamp terminal 40, the three wire branch circuit conductors being brought out through knockouts (not shown) in the side and end walls of housing 11.

It is an important feature of this invention that individual removal of a plug fuse 47 from receptacle 44, when receptacle 44 is plugged into terminal box 27, cannot be effected, and, accordingly, replacement of a "blown" fuse 47 only can be achieved by removing receptacle 44.

Another important feature of this invention is that complete disconnection of a three wire branch circuit with plug fuse protection can be effected, without removal of panel 15, by the simple expedient of withdrawing receptacle 44 from terminal box 27. Such a result is obtainable by virtue of the fact that opening 20 is sufficiently large to permit removal and insertion of receptacle 44 without removal of panel 15.

Also shown in FIGURE 1 is a receptacle 57 which is basically the same as receptacle 44, but which has no flaps 54 and no handle 45. Receptacle 57 carries two screw-in plug fuses 58. As shown in FIG. 1, prongs 53 extending from receptacle 57 have barbs 59 projecting therefrom. These barbs 59 engage busbars 31 and 32, when receptacle 57 is positioned in compartment 29, and serve to lock receptacle 57 in terminal box 27. When two two wire circuits are desired, receptacle 57 is plugged into terminal box 27 in compartment 29. One conductor of one two wire circuit is connected to contact 43 by screw 43a, while the other conductor of this two wire branch circuit is connected to busbar 38 by one clamp terminal 40. The other branch circuit is obtained from a conductor connected to the other contact 43 and another return conductor connected to busbar 38 by a clamp terminal 40.

When two two wire circuits are so provided, they become permanent in nature, since receptacle 57 cannot be removed from terminal box 27 without dismantling the service centre. On the other hand, plug fuses 58 are individually removable when in circuit to permit disconnection of the circuit or replacement of a "blown" fuse without removal of receptacle 57.

While this invention has been particularly described in connection with the use of screw-in plug fuses, it will be appreciated that it is not restricted thereto, and other types of screw-in overcurrent devices may be employed without departing from this invention. An overcurrent device, as the term is used herein, means a device which is adapted to open a circuit in response to a current of a predetermined magnitude, whether the opening of the circuit is achieved by the melting of a part of the overcurrent device in the circuit, or otherwise. Thus, any type of screw-in plug circuit breakers can be employed in place of screw-in plug fuses.

While preferred embodiments of this invention have been described herein, those skilled in the art will appreciate that changes and modifications may be made in this invention without departing from the spirit and scope of this invention as defined in the appended claims.

What I claim as my invention is:

1. An electrical load distribution service centre comprising a housing including a removable panel with at least one opening therein, a neutral busbar and first and second other busbars all electrically insulated from each other and positioned in said housing behind said panel, at least one plug-in receptacle adapted to hold therein two screw-in overcurrent devices threadably engaged within said one receptacle, said receptacle having two first contact means and two second contact means, each of said first contact means being adapted to contact a different one of said first and second busbars when said receptacle is positioned in said housing and being adapted to contact a terminal of a different one of said overcurrent devices when said overcurrent devices are screwed into said receptacle and held therein, each of said second contact means being adapted to contact another terminal of a different one of said overcurrent devices when said overcurrent devices are screwed into said receptacle and held therein, whereby circuits from each of said first and second busbars, through said first contact means, and through said overcurrent devices to said second contact means are established when said receptacle is positioned in said housing and said overcurrent devices are screwed into said receptacle and held therein, and at least two contacts within said housing each adapted to contact a different one of said second contact means when said receptacle is positioned in said housing, the size of the opening in said panel being sufficiently large that said receptacle may be placed in said housing through said opening without removal of said panel and inserted in said housing to an extent sufficient to effect contact between said first and second busbars and said first contact means, means for preventing independent removal of overcurrent devices screwed into said one receptacle and held therein when said one receptacle is positioned in said housing with said first contact means in contact with said first and second busbars, said last-mentioned means comprising flaps mounted on said one receptacle and closable over overcurrent devices screwed into said one receptacle and held therein, and means retaining said flaps in closed position over overcurrent devices screwed into said one receptacle and held therein when said one receptacle is positioned in said housing with said first contact means in contact with said first and second busbars.

2. An electrical load distribution service centre comprising a housing including a removable panel with at least one opening therein, a neutral busbar and first and second other busbars all electrically insulated from each other and positioned in said housing behind said panel, at least one plug-in receptacle adapted to hold therein two screw-in overcurrent devices threadably engaged within said one receptacle, said receptacle having two first contact means and two second contact means, each of said first contact means being adapted to contact a different one of said first and second busbars when said receptacle is positioned in said housing and being adapted to contact a terminal of a different one of said overcurrent devices when said overcurrent devices are screwed into said receptable and held therein, each of said second contact means being adapted to contact another terminal of a different one of said overcurrent devices when said overcurrent devices are screwed into said receptacle and held therein, whereby circuits from each of said first and second busbars, through said first contact means, and through said overcurrent devices to said second contact means are established when said receptacle is positioned in said housing and said overcurrent devices are screwed into said receptacle and held therein, and at least two contacts within said housing each adapted to contact a different one of said second contact means when said receptacle is positioned in said housing, the size of the opening in said panel being sufficiently large that said receptacle may be placed in said housing through said opening without removal of said panel and inserted in said housing to an extent sufficient to effect contact between said first and second busbars and said first contact means, said one receptable being removable from said housing through said opening without removal of said panel, and including means for preventing independent removal of overcurrent devices screwed into said one receptacle and held therein when said one receptacle is positioned in said housing with said first contact means in contact with said first and second busbars, said last-mentioned means comprising flaps mounted on said one receptacle and closable over overcurrent devices screwed into said one receptacle and held therein, and means retaining said flaps in closed position over overcurrent devices screwed into said one receptacle and held therein when said one receptacle is positioned in said housing with said first contact means in contact with said first and second busbars.

3. An electrical load distribution service centre comprising a housing including a removable panel with at least one opening therein, a neutral busbar and first and second other busbars all electrically insulated from each other and positioned in said housing behind said panel, at least two plug-in receptacles each adapted to hold therein two screw-in overcurrent devices threadably engaged within said receptacles, each said receptacle having two first contact means and two second contact means, each of said first contact means being adapted to contact a different one of said first and second busbars when said receptacle is positioned in said housing and being adapted to contact a terminal of a different one of said overcurrent devices when said overcurrent devices are screwed into said receptacle and held therein, each of said second contact means being adapted to contact another terminal of a different one of said overcurrent devices when said overcurrent devices are screwed into said receptacle and held therein, whereby circuits from each of said first and second busbars, through said first contact means, and through said overcurrent devices to said second contact means are established when said receptacle is positioned in said housing and said overcurrent devices are screwed into said receptacle and held therein, and at least four contacts within said housing each adapted to contact a different one of said second contact means when said receptacles are positioned in said housing, the size of the opening in said panel being sufficiently large that said receptacles may be placed in said housing through said opening without removal of said panel and inserted in said housing to an extent sufficient to effect contact between said first and second busbars and said first contact means, locking means for locking a first of said receptacles in said housing with said first contact means of said first receptacle contacting said first and second busbars, and means for preventing independent removal of overcurrent devices screwed into the second of said receptacles and held therein when said second receptacle is positioned in said housing with said first contact means of said second receptacle in contact with said first and second busbars, overcurrent devices screwed into said first receptacle and held therein being independently removable from said first receptacle when said first receptacle is positioned in said housing, and wherein said means for preventing independent removal of overcurrent devices screwed into said second receptacle and held therein when said second receptacle is positioned in said housing with said first contact means of said second receptacle in contact with said first and second busbars comprises flaps mounted on said second receptacle and closable over overcurrent devices screwed into said second receptacle and held therein, and means retaining said flaps in closed position over overcurrent devices screwed into said second receptacle and held therein when said second receptacle is positioned in said housing with said first contact means thereof in contact with said first and second busbars.

4. An electrical load distribution service centre comprising a housing including a removable panel with at least one opening therein, a neutral busbar and first and second other busbars all electrically insulated from each other and positioned in said housing behind said panel, at least one plug-in receptacle adapted to hold therein two screw-in overcurrent devices threadably engaged with said one receptacle, said receptacle having two first contact means and two second contact means, each of said first contact means being adapted to contact a different one of said first and second busbars when said receptacle is positioned in said housing and being adapted to contact a terminal of a different one of said overcurrent devices when said overcurrent devices are screwed into said receptacle and held therein, each of said second contact means being adapted to contact another terminal of a different one of said overcurrent devices when said overcurrent devices are screwed into said receptacle and held therein, whereby circuits from each of said first and second busbars, through said first contact means, and through said overcurrent devices to said second contact means are established when said receptacle is positioned in said housing and said overcurrent devices are screwed into said receptacle and held therein, and at least two contacts within said housing each adapted to contact a different one of said second contact means when said receptacle is positioned in said housing, and including means for preventing independent removal of overcurrent devices screwed into said receptacle and held therein when said receptacle is positioned in said housing with said first contact means in contact with said first and second busbars, said last-mentioned means comprising flaps mounted on said receptacle and closable over overcurrent devices screwed into said receptacle and held therein, and means retaining said flaps in closed position over overcurrent devices screwed into said receptacle and held therein when said receptacle is positioned in said housing with said first contact means in contact with said first and second busbars.

5. An electrical load distribution service centre comprising a neutral busbar and first and second other busbars, means electrically insulating said busbars from each other, at least one housing for screw-in overcurrent devices, said housing having two sockets therein each adapted to receive a screw-in overcurrent device, two screw-in overcurrent devices each having first and second terminals, each of said screw-in overcurrent devices being threadably engaged in a different one of said sockets with said first terminal of one of said screw-in overcurrent devices electrically connected to said first busbar and first terminal of the other of said screw-in overcurrent devices electrically connected to said second busbar, said housing having two contact means each adapted for electrical connection to a different one of said second terminals, and means for preventing independent removal of said screw-in overcurrent devices at all times, said contact means are electrically connected to said first and second busbars.

6. An electrical load distribution service centre according to claim 5 wherein said last-mentioned means is mounted on said housing in a position where a part of said last-mentioned means extends over said screw-in overcurrent devices.

7. An electrical load distribution service centre according to claim 6 wherein said screw-in overcurrent devices are visible through said last-mentioned means.

8. An electrical load distribution service centre comprising a housing including a removable panel with at least one opening therein, a neutral busbar and first and second other busbars all electrically insulated from each other and positioned in said housing behind said panel, at least one plug-in receptacle adapted to hold therein two screw-in overcurrent devices threadably engaged within said one receptacle, said receptacle having two first contact means and two second contact means, each of said first contact means being adapted to contact a different one of said first and second busbars when said receptacle is positioned in said housing and being adapted to contact a terminal of a different one of said overcurrent devices when said overcurrent devices are screwed into said receptacle and held therein, each of said second contact means being adapted to contact another terminal of a different one of said overcurrent devices when said overcurrent devices are screwed into said receptacle and held therein, whereby circuits from each of said first and second busbars, through said first contact means, and through said overcurrent devices to said second contact means are established when said receptacle is positioned in said housing and said overcurrent devices are screwed into said receptacle and held therein, and at least two contacts permanently mounted within said housing, different ones of said second contact means being positioned to slide into physical and electrical contact with said two contacts during plugging into said housing of said receptacle and to slide out of physical and electrical contact with said two contacts during removal of said receptacle from said housing, the size of the opening in said panel being sufficiently large that said receptacle may be plugged into said housing through said opening without removal of said panel and inserted in said housing to an extent sufficient to effect contact between said first and second busbars and said first contact means and sliding contact between said second contact means and said two contacts, and locking means for locking said one receptacle in said housing with said first contact means contacting said first and second busbars, said first contact means comprising two sets of prongs and said locking means comprising barbs projecting from said prongs and engageable with said first and second busbars.

9. An electrical load distribution service centre comprising a housing including a removable panel with at least one opening therein, a neutral busbar and first and second other busbars all electrically insulated from each other and positioned in said housing behind said panel, at least one plug-in receptacle adapted to hold therein two screw-in overcurrent devices threadably engaged within said one receptacle, said receptacle having two first contact means and two second contact means, each of said first contact means being adapted to contact a different one of said first and second busbars when said receptacle is positioned in said housing and being adapted to contact a terminal of a different one of said overcurrent devices when said overcurrent devices are screwed into said receptacle and held therein, each of said second contact means being adapted to contact another terminal of a different one of said overcurrent devices when said overcurrent devices are screwed into said receptacle and held therein, whereby circuits from each of said first and second busbars, through said first contact means, and through said overcurrent devices to said second contact means are established when said receptacle is positioned in said housing and said overcurrent devices are screwed into said receptacle and held therein, and at least two contacts permanently mounted within said housing, different ones of said second contact means being positioned to slide into physical and electrical contact with said two contacts during plugging into said housing of said receptacle and to slide out of physical and electrical contact with said two contacts during removal of said receptacle from said housing, the size of the opening in said panel being sufficiently large that said receptacle may be plugged into said housing through said opening without removal of said panel and inserted in said housing to an extent sufficient to effect contact between said first and second busbars and said first contact means and sliding contact between said second contact means and said two contacts, locking means for locking said one receptacle in said housing with said first contact means contacting said first and second busbars, said first contact means comprising two sets of prongs and said locking means comprising barbs projecting from said prongs and engageable with said first and second busbars, and overcurrent devices screwed into said one receptacle and held therein being independently removable from said one receptacle when said one receptacle is positioned in said housing.

References Cited by the Examiner

UNITED STATES PATENTS

| | | | |
|---|---|---|---|
| 897,474 | 9/1908 | Mentzer | 200—130 X |
| 1,638,257 | 9/1927 | Gunn | 317—116 |
| 1,782,019 | 11/1930 | Wheeler | 317—116 |
| 2,276,226 | 3/1942 | Cole et al. | 317—119 |
| 3,020,373 | 2/1962 | Kobryner et al. | 200—114 X |
| 2,020,373 | 2/1962 | Kobryner et al. | 200—114 X |
| 3,057,981 | 10/1962 | Todoran | 200—115.5 |

ROBERT K. SCHAEFER, *Primary Examiner.*

JOHN F. BURNS, KATHLEEN H. CLAFFY,
*Examiners.*

S. H. BOYER, J. J. BOSCO, *Assistant Examiners.*